United States Patent
Hong

(10) Patent No.: US 11,968,726 B2
(45) Date of Patent: Apr. 23, 2024

(54) METHOD AND APPARATUS FOR RANDOM ACCESS ON UNLICENSED SPECTRUM, AND STORAGE MEDIUM

(71) Applicant: BEIJING XIAOMI MOBILE SOFTWARE CO., LTD., Beijing (CN)

(72) Inventor: Wei Hong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 383 days.

(21) Appl. No.: 17/593,849

(22) PCT Filed: Apr. 1, 2019

(86) PCT No.: PCT/CN2019/080838
§ 371 (c)(1),
(2) Date: Sep. 26, 2021

(87) PCT Pub. No.: WO2020/199084
PCT Pub. Date: Oct. 8, 2020

(65) Prior Publication Data
US 2022/0191922 A1    Jun. 16, 2022

(51) Int. Cl.
*H04W 74/0833* (2024.01)
*H04W 72/0453* (2023.01)
(Continued)

(52) U.S. Cl.
CPC ..... *H04W 74/085* (2013.01); *H04W 72/0453* (2013.01); *H04W 74/0866* (2013.01); *H04W 84/12* (2013.01)

(58) Field of Classification Search
CPC ........... H04W 74/085; H04W 72/0453; H04W 74/0866; H04W 84/12; H04W 74/08
See application file for complete search history.

(56) References Cited

U.S. PATENT DOCUMENTS 6,522,881 B1 * 2/2003 Feder ................... H04W 16/06
                                                        455/437
2004/0039817 A1 * 2/2004 Lee ...................... H04W 24/00
                                                        709/225
(Continued)

FOREIGN PATENT DOCUMENTS

CN          105472762 A      4/2016
CN          106358315 A      1/2017
(Continued)

OTHER PUBLICATIONS

International Search Report in the international application No. PCT/CN2019/080838, mailed on Jan. 6, 2020.
(Continued)

*Primary Examiner* — Chae S Lee
(74) *Attorney, Agent, or Firm* — Syncoda LLC; Feng Ma

(57) ABSTRACT

A method and apparatus for random access on an unlicensed spectrum, and a storage medium involve: a terminal acquiring a beacon frame sent by a WLAN AP working on n available spectrums for random access, n being a positive integer; the terminal selecting, according to channel indication information included in the beacon frame, a first available spectrum for random access from among the n available spectrums for random access; and the terminal initiating random access on the first available spectrum for random access.

9 Claims, 5 Drawing Sheets

---

A terminal acquires beacon frames from WLAN APs operating on n random access available frequency bands, n being a positive integer — 201

The terminal selects a first random access available frequency band from the n random access available frequency bands based on channel indication information in respective beacon frames — 202

The terminal initiates an random access in the first random access available frequency band — 203

(51) Int. Cl.
*H04W 74/08* (2024.01)
*H04W 84/12* (2009.01)

(56) References Cited

U.S. PATENT DOCUMENTS

| | | | |
|---|---|---|---|
| 2008/0102852 A1 | 5/2008 | Du | |
| 2012/0300759 A1* | 11/2012 | Patanapongpibul | H04W 48/14 370/338 |
| 2015/0351026 A1* | 12/2015 | Lee | H04W 72/52 370/237 |
| 2016/0095120 A1 | 3/2016 | Gaal et al. | |
| 2016/0337177 A1 | 11/2016 | Lindoff et al. | |
| 2016/0366633 A1* | 12/2016 | Luo | H04W 72/04 |
| 2018/0020367 A1 | 1/2018 | Hsu et al. | |
| 2019/0029054 A1 | 1/2019 | Li et al. | |
| 2020/0267771 A1* | 8/2020 | Deogun | H04L 5/0058 |

FOREIGN PATENT DOCUMENTS

| | | |
|---|---|---|
| CN | 108631971 A | 10/2018 |
| CN | 109309961 A | 2/2019 |
| WO | 2015090396 A1 | 6/2015 |

OTHER PUBLICATIONS

Written Opinion of the International Search Authority in the international application No. PCT/CN2019/080838, mailed on Jan. 6, 2020.
Supplementary European Search Report in the European application No. 19923634.0, mailed on Sep. 28, 2022.

* cited by examiner

METHOD AND APPARATUS FOR RANDOM ACCESS ON UNLICENSED SPECTRUM, AND STORAGE MEDIUM

CROSS-REFERENCE TO RELATED APPLICATION

The present application is a national stage of International Application No. PCT/CN2019/080838 filed on Apr. 1, 2019, the disclosure of which is hereby incorporated by reference in its entirety.

TECHNICAL FIELD

Embodiments of the disclosure relate to the technical field of communications, and particularly to a method and device for random access in an unlicensed frequency band, and a storage medium.

BACKGROUND

In order to improve utilization of spectrum resources, the 5th-generation (5G) New Radio (NR) system may occupy both licensed frequency bands and unlicensed frequency bands for information transmission.

An unlicensed frequency band refers to a spectrum resource that can be used as long as a management agency requires. Terminals that perform transmission in the unlicensed frequency band need to follow a Listen before talk (LBT) mechanism. That is, a terminal needs to perform the LBT process before transmitting information on the unlicensed frequency band, to detect whether the unlicensed frequency band is occupied or not. The terminal may occupy the unlicensed frequency band for transmitting the information only when it is determined that the unlicensed frequency band has not been occupied, i.e., in an idle state. The LBT mechanism requires the terminal to compete with other terminals and may transmit the information only when the contention is successful.

Similarly, the terminal needs to perform the LBT process before the terminal initiates a random access process in the unlicensed frequency band. When the competition fails all the time due to fierce contention in the unlicensed frequency band, the terminal cannot initiate the random access successfully.

SUMMARY

The embodiments of the disclosure provide a method and device for random access in an unlicensed frequency band, and a storage medium. The technical solution is as follows.

According to a first aspect of the embodiments of the disclosure, a method for random access in an unlicensed frequency band is provided, and the method includes the following operations.

A terminal acquires beacon frames from Wireless Local Area Network Access Points (WLAN APs) operating on n random access available frequency bands. A random access available frequency band is a frequency band, in the unlicensed frequency band, available for the terminal to initiate the random access, and n is a positive integer.

The terminal selects a first random access available frequency band from the n random access available frequency bands based on channel indication information in respective beacon frames. Channel indication information in a beacon frame sent by a WLAN AP operating on an i-th random access available frequency band indicates a channel congestion level of the i-th random access available frequency band, and i is a positive integer less than or equal to n.

The terminal initiates the random access in the first random access available frequency band.

In a possible implementation, the operation that the terminal selects the first random access available frequency band from the n random access available frequency bands based on the channel indication information in the respective beacon frames may include the following actions.

The terminal determines channel congestion levels of the n random access available frequency bands based on the channel indication information in the respective beacon frames.

The terminal selects a random access available frequency band with a lowest channel congestion level from the n random access available frequency bands as the first random access available frequency band.

In a possible implementation, the method may further include the following operations.

In response to the terminal failing to initiate the random access in the first random access available frequency band, the terminal selects a second random access available frequency band from the n random access available frequency bands based on the channel indication information in the respective beacon frames. The second random access available frequency band is different from the first random access available frequency band.

The terminal initiates the random access in the second random access available frequency band.

In a possible implementation, the channel indication information may include at least one of: a Basic Service Set (BSS) load element or a BSS average access delay element.

According to a second aspect of the embodiments of the disclosure, a device for random access in an unlicensed frequency band is provided. The device is applied in a terminal and includes a Wireless Fidelity (Wi-Fi) component and a cellular component.

The Wi-Fi component is configured to acquire beacon frames from WLAN APs operating on n random access available frequency bands. A random access available frequency band is a frequency band, in the unlicensed frequency band, available for the terminal to initiate the random access, and n is a positive integer.

The cellular component is configured to select a first random access available frequency band from the n random access available frequency bands based on channel indication information in respective beacon frames. Channel indication information in a beacon frame sent by a WLAN AP operating on an i-th random access available frequency band indicates a channel congestion level of the i-th random access available frequency band, and i is a positive integer less than or equal to n.

The cellular component is further configured to initiate the random access in the first random access available frequency band.

In a possible implementation, the cellular component may be further configured to determine channel congestion levels of the n random access available frequency bands based on the channel indication information in the respective beacon frames, and select a random access available frequency band with a lowest channel congestion level from the n random access available frequency bands as the first random access available frequency band.

In a possible implementation, the cellular component may be further configured to: in response to the terminal failing to initiate the random access in the first random access available frequency band, select a second random access available frequency band from the n random access available frequency bands based on the channel indication information in the respective beacon frames. The second random access available frequency band is different from the first random access available frequency band.

The cellular component is further configured to initiate the random access in the second random access available frequency band.

According to a third aspect of the embodiments of the disclosure, a device for random access in an unlicensed frequency band is provided. The device is applied in a terminal and includes a Wi-Fi component, a processing component and a cellular component.

The Wi-Fi component is configured to acquire beacon frames from WLAN APs operating on n random access available frequency bands. A random access available frequency band is a frequency band, in the unlicensed frequency band, available for the terminal to initiate the random access, and n is a positive integer.

The processing component is configured to select a first random access available frequency band from the n random access available frequency bands based on channel indication information in respective beacon frames. Channel indication information in a beacon frame sent by a WLAN AP operating on an i-th random access available frequency band indicates a channel congestion level of the i-th random access available frequency band, and i is a positive integer less than or equal to n.

The cellular component is configured to initiate the random access in the first random access available frequency band.

In a possible implementation, the processing component may be further configured to determine channel congestion levels of the n random access available frequency bands based on the channel indication information in the respective beacon frames, and select a random access available frequency band with a lowest channel congestion level from the n random access available frequency bands as the first random access available frequency band.

In a possible implementation, the processing component may be further configured to: in response to the terminal failing to initiate the random access in the first random access available frequency band, select a second random access available frequency band from the n random access available frequency bands based on the channel indication information in the respective beacon frames. The second random access available frequency band is different from the first random access available frequency band.

The cellular component is further configured to initiate the random access in the second random access available frequency band.

According to a fourth aspect of the embodiments of the disclosure, a device for random access in an unlicensed frequency band is provided. The device is applied in a terminal and includes:
  a processor, and
  a memory for storing instructions executable by the processor.

The processor is configured to perform the following operations.

Beacon frames are acquired from WLAN APs operating on n random access available frequency bands. A random access available frequency band is a frequency band, in the unlicensed frequency band, available for the terminal to initiate the random access, and n is a positive integer.

A first random access available frequency band is selected from the n random access available frequency bands based on channel indication information in respective beacon frames. Channel indication information in a beacon frame sent by a WLAN AP operating on an i-th random access available frequency band indicates a channel congestion level of the i-th random access available frequency band, and i is a positive integer less than or equal to n.

The random access is initiated in the first random access available frequency band.

According to a fifth aspect of the embodiments of the disclosure, there is provided a non-transitory computer-readable storage medium having stored thereon a computer program which, when being executed by a processor, causes the processor to implement the operations of the method of the first aspect.

Technical solutions provided in the embodiments of the disclosure may have the following beneficial effects.

For the random access in the unlicensed frequency band, the terminal acquires beacon frames from WLAN APs operating on multiple random access available frequency bands, and selects, based on channel indication information in respective beacon frames, a random access available frequency band from the multiple random access available frequency bands for initiating the random access. In such manner, the fact that the WLAN AP operates on the unlicensed frequency band is fully considered, and the channel congestion levels of the respective random access available frequency bands are acquired through the WLAN AP. Moreover, an appropriate random access available frequency band is selected for initiating the random access based on the channel congestion levels. Therefore, a success rate of a random access initiated by the terminal may be improved.

It should be understood that the foregoing general description and the following detailed description are exemplary and explanatory only and are not intended to limit the disclosure.

BRIEF DESCRIPTION OF THE DRAWINGS

The accompanying drawings, which are incorporated in and constitute a part of this specification, illustrate embodiments of the disclosure and, together with the description, serve to explain the principle of the disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of devices and methods consistent with some aspects related to the disclosure as recited in the appended claims.

The network architecture and service scenario described in the embodiments of the present disclosure are for clear illustration of the technical solution of the embodiments of the present disclosure, and should not be construed as limitations of the technical solution provided in the embodiments of the present disclosure. Those skilled in the art will understand that the technical solution provided in the embodiments of the present disclosure may also be applicable to similar technical problems that will appear with evolution of the network architecture and emergence of new service scenarios.

Figure 1:
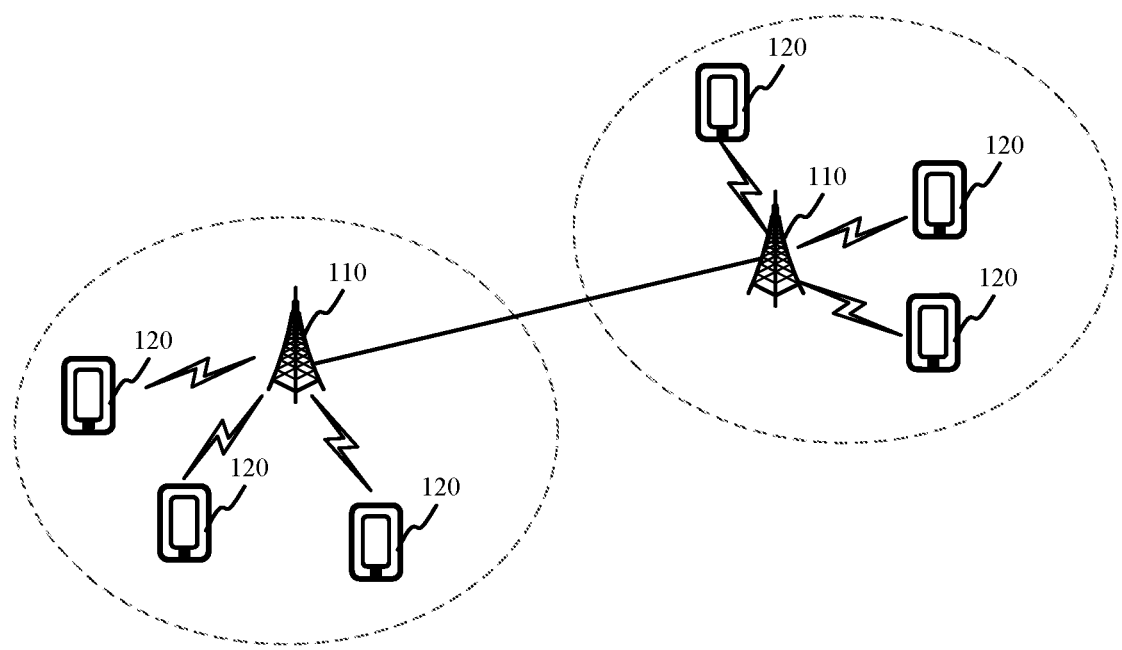
FIG. 1 is a diagram illustrating a network architecture according to an exemplary embodiment.

FIG. 1 is a diagram illustrating a network architecture according to an exemplary embodiment. The network architecture may include a base station 110 and a terminal 120.

The base station 110 is deployed in an access network. The access network in the 5G NR system may be called a New Generation-Radio Access Network (NG-RAN). The base station 110 and the terminal 120 communicate with each other through a certain air interface technology, such as a cellular technology.

The base station 110 is a device deployed in the access network to provide a wireless communication function for the terminal 120. The base station 110 may include various forms of macro base stations, micro base stations, relay stations, access points, etc. Devices with a base station function may have different names in systems using different radio access technologies. For example, in 5G NR system, the device is called a gNodeB or a gNB. As the communication technology evolves, the name of the "base station" may change. For ease of description, in the embodiments of the present disclosure, the above-mentioned devices for providing wireless communication function for the terminal 120 are collectively referred to as base stations.

There may be a plurality of terminals 120, and one or more terminals 120 may be distributed in a cell managed by a base station 110. The terminal 120 may include various devices with wireless communication functions, such as handheld devices, vehicle-mounted devices, wearable devices, computing devices or other processing devices connected to a wireless modem, as well as various forms of User Equipment (UE), Mobile Stations (MS) and terminal devices. For ease of description, in the embodiments of the present disclosure, the above-mentioned devices are collectively referred to as terminals.

The "5G NR system" in the embodiments of the present disclosure may also be referred to as a 5G system or an NR system, the meaning of which would be understood by those skilled in the art. The technical solution described in the embodiments of the present disclosure may be applied to the 5G NR system, and may also be applied to evolved systems follow-up with the 5G NR system.

Figure 2:
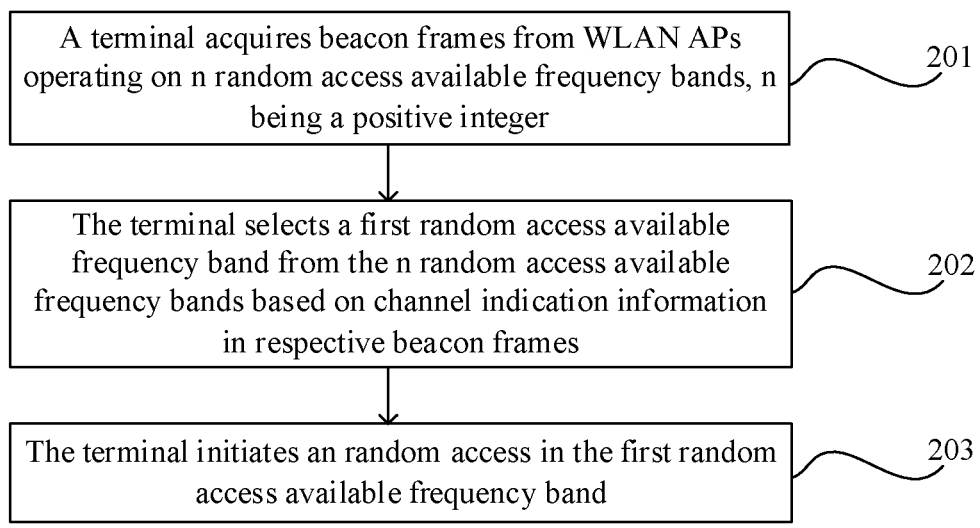
FIG. 2 is a flowchart illustrating a method for random access in an unlicensed frequency band according to an exemplary embodiment.

FIG. 2 is a flowchart illustrating a method for random access in an unlicensed frequency band according to an exemplary embodiment. The method may be applied to the terminal 120 illustrated in FIG. 1. The method includes the following operations 201-203.

At operation 201, a terminal acquires beacon frames from WLAN APs operating on n random access available frequency bands, n being a positive integer.

In the embodiment of the present disclosure, a random access available frequency band refers to a frequency band, in the unlicensed frequency band, available for the terminal to initiate the random access. In the embodiment of the present disclosure, the number of the random access available frequency bands for the terminal is not limited herein. The terminal may have one random access available frequency band or may have a plurality of random access available frequency bands. In addition, the random access available frequency bands may be configured by the base station to the terminal, for example, through system information.

The WLAN AP, which may also be referred to as a "hot-spot", is an access point in a wireless network and used for the terminal to access a Wireless Local Area Network (WLAN). The WLAN AP may broadcast a beacon frame for the terminal to scan and access. In the embodiment of the present disclosure, when the terminal receives a beacon frame in a random access available frequency band, it is indicated that there is a WLAN AP operating on the random access available frequency band near the terminal.

In an example, for example, the terminal has three random access available frequency bands, i.e., a frequency band 1, a frequency band 2 and a frequency band 3. When the terminal receives a beacon frame 1 in the frequency band 1, it is indicated that there is a WLAN AP operating on the frequency band 1 near the terminal. When the terminal receives two different beacon frames in the frequency band 2, for example, a beacon frame 2 and a beacon frame 3, it is indicated that there may be a plurality of WLAN APs operating on the frequency band 2 near the terminal. When the terminal receives no beacon frame in the frequency band 3, it is indicated that there is no WLAN AP operating on the frequency band 3 near the terminal.

In a possible implementation, before the terminal initiates the random access to the base station, the terminal is required to perform the LBT process, and the terminal may search for the WLAN APs operating on the respective random access available frequency bands and acquire the beacon frames from the WLAN APs.

At operation 202, the terminal selects a first random access available frequency band from the n random access available frequency bands based on channel indication information in respective beacon frames.

In the embodiment of the disclosure, the channel indication information in a beacon frame sent by a WLAN AP operating on an i-th random access available frequency band indicates a channel congestion level of the i-th random access available frequency band, and i is a positive integer less than or equal to n.

Still taking the above example as an example, when the terminal acquires the beacon frame 1 sent by WLAN AP #1 in the frequency band 1, the channel indication information in the beacon frame 1 indicates the channel congestion level of the frequency band 1. When the terminal acquires the beacon frame 2 sent by WLAN AP #2 and the beacon frame 3 sent by WLAN AP #3 in the frequency band 2, the channel indication information in the beacon frame 2 indicates the channel congestion level of frequency band 2, and the channel indication information in the beacon frame 3 also indicates the channel congestion level of the frequency band 2. It is noted that the channel indication information in the beacon frame 2 indicates the channel congestion level measured by the WLAN AP #2, and the channel indication information in the beacon frame 3 indicates the channel congestion level measured by the WLAN AP #3. Although the two WLAN APs both operate on the frequency band 2, the channel congestion levels measured by the two WLAN APs may be the same, and may also be different.

In other words, the channel congestion levels measured by the plurality of WLAN APs operating on the same frequency band may be the same, and may also be different. In addition, the plurality of pieces of channel indication information in the plurality of beacon frames sent by a same WLAN AP operating on a certain frequency band at different moments may indicate the same or different channel congestion levels. This is because the channel congestion level of a same frequency band may change at different moments.

In a possible implementation, the channel indication information may include, but is not limited to, at least one of a Basic Service Set (BSS) load element or a BSS average access delay element. The type of the channel indication information is not limited in the embodiment of the disclosure.

The BBS load element indicates a load size corresponding to a channel. The larger a value of the BBS load element, the higher the channel congestion level. The smaller the value of the BBS load element, the lower the channel congestion level.

The BSS average access delay element indicates the average access delay time corresponding to the channel. The larger a value of the BSS average access delay element, the higher the channel congestion level. The smaller the value of the BSS average access delay element, the lower the channel congestion level.

If the channel congestion level of a random access available frequency band is higher, the probability that the terminal obtains a transmission opportunity in the random access available frequency band is lower. If the channel congestion level of a random access available frequency band is lower, the probability that the terminal obtains a transmission opportunity in the random access available frequency band is higher.

The terminal may determine the channel congestion level of each random access available frequency band based on the channel indication information in the respective beacon frame, and select an appropriate random access available frequency band (for example, a random access available frequency band with a lower channel congestion level) for random access based on the channel congestion level of each random access available frequency band. The first random access available frequency band is a random access available frequency band selected by the terminal from the n random access available frequency bands.

In a possible implementation, the operation 202 may include the following sub-operations.

1. The terminal determines channel congestion levels of the n random access available frequency bands based on the channel indication information in the respective beacon frames.

2. The terminal selects a random access available frequency band with a lowest channel congestion level from the n random access available frequency bands as the first random access available frequency band.

For example, the terminal has three random access available frequency bands, i.e., the frequency band 1, the frequency band 2 and the frequency band 3. The channel indication information in the bacon frame is the BSS load element. A value corresponding to the BSS load element in the beacon frame received by the terminal in the frequency band 1 is 100, a value corresponding to the BSS load element in the beacon frame received in the frequency band 2 is 150, and a value corresponding to the BSS load element in the beacon frame received in the frequency band 3 is 200. Thus, the terminal determines that the channel congestion levels of the three random access available frequency bands from low to high are: the frequency band 1, the frequency band 2 and the frequency band 3. The terminal selects the frequency band 1 as the first random access available frequency band because the frequency band 1 has the lowest channel congestion level.

When the channel indication information includes both the BSS load element and the BSS average access delay element, the terminal may select the first random access available frequency band based on the BSS load element or the BSS average access delay element by default. Alternatively, the terminal may select the first random access available frequency band based on both the BSS load element and the BSS average access delay element. For example, a weighted average is performed on values corresponding to the BSS load element and the BSS average access delay element, and the first random access available frequency band may be selected based on the weighted average value of the BSS load element and the BSS average access delay element.

When there are a plurality of WLAN APs operating on one random access available frequency band, the channel congestion level of the random access available frequency band may be determined based on an average of the channel indication information in the beacon frames sent by the plurality of WLAN APs respectively. When there is only one WLAN AP operating on one random access available frequency band, the channel congestion level of the random access available frequency band may be determined directly based on the channel indication information in the beacon frame sent by the WLAN AP.

For example, both the WLAN AP #1 and the WLAN AP #2 operate on the frequency band 1, and the channel indication information in the beacon frame is BSS average access delay element. A value corresponding to the BSS average access delay element in the beacon frame received by the terminal from the WLAN AP #1 is 100, and a value corresponding to the BSS average access delay element in the beacon frame received by the terminal from the WLAN AP #2 is 80. Then the channel congestion level of the frequency band 1 may be determined as (100+80)/2=90.

In another example, only the WLAN AP #3 is searched out by the terminal in the frequency band 2. The channel indication information in the beacon frame sent by the WLAN AP #3 is BSS average access delay element, and a value corresponding to the BSS average access delay element in the beacon frame received by the terminal from the WLAN AP #3 is 100. Then the channel congestion level of the frequency band 2 may be determined as 100.

According to the above two examples, the terminal selects the frequency band 1 as the first random access available frequency band from the frequency band 1 and frequency band 2, because the channel congestion level of the frequency band 1 is lower than that of the frequency band 2.

At operation 203, the terminal initiates the random access in the first random access available frequency band.

After the random access is completed, the terminal may establish a Radio Resource Control (RRC) connection and transmit information (for example, service data or control signaling) through the RRC connection. In addition, the terminal is required to perform the LBT process before initiating the random access. Since the frequency band selected by the terminal has a lower channel congestion level, a success rate of the LBT process performed by the terminal may be higher, which may facilitate the subsequent successful initiation of the random access.

In a possible implementation, the method may further include the following operations.

(1) In response to the terminal failing to initiate the random access in the first random access available frequency band, the terminal selects a second random access available frequency band from the n random access available frequency bands based on the channel indication information in the respective beacon frames. The second random access available frequency band is different from the first random access available frequency band.

Optionally, the second random access available frequency band has a second lowest channel congestion level to the first random access available frequency band.

(2) The terminal initiates the random access in the second random access available frequency band.

Still taking the above example as an example, when the terminal fails to initiate the random access in the frequency band 1, the terminal continues to initiate the random access in the frequency band 2.

In another embodiment, when the terminal fails to initiate the random access in the first random access available frequency band, the terminal continues to initiate the random access in the first random access available frequency band until the random access is successful.

According to the technical solution provided in the embodiments of the disclosure, for the random access in the unlicensed frequency band, the terminal acquires beacon frames from WLAN APs operating on a plurality of random access available frequency bands, and selects, based on channel indication information in respective beacon frames, a random access available frequency band from the plurality of random access available frequency bands for initiating the random access. The fact that the WLAN AP also operates on the unlicensed frequency band is fully considered, and the channel congestion levels of the plurality of random access available frequency bands are acquired by using the WLAN APs. Moreover, an appropriate random access available frequency band is selected for initiating the random access based on the channel congestion levels. Therefore, the success rate of the random access initiated by the terminal may be improved.

The following device embodiments may be used for implementing the method embodiments of the present disclosure. For the detail not disclosed in the device embodiments, reference is made to the method embodiments of the present disclosure.

Figure 3:
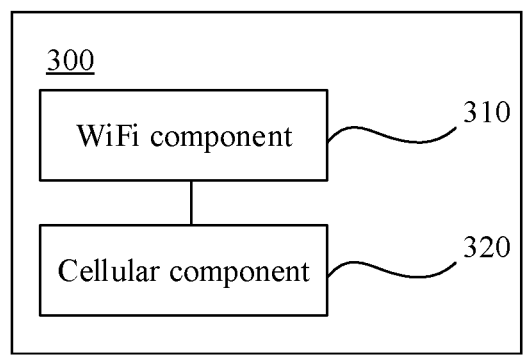
FIG. 3 is a block diagram illustrating a device for random access in an unlicensed frequency band according to an exemplary embodiment.

FIG. 3 is a block diagram illustrating a device for random access in an unlicensed frequency band according to an exemplary embodiment. The device is capable of implementing the operations in the above method examples, and the operations may be implemented through hardware or software executed by the hardware. The device may be the terminal described above, and may also be provided in the terminal. The device 300 may include a Wi-Fi component 310 and a cellular component 320.

The Wi-Fi component 310 is a communication component configured to access a WLAN network, and the WLAN network may also be referred to as a Wi-Fi network. The WLAN network may include several WLAN APs. The terminal may search for a WLAN AP operating on a random access available frequency band through the Wi-Fi component 310, and acquire the beacon frame sent by the WLAN AP through the Wi-Fi component 310.

The cellular component 320 is a communication component configured to access a cellular network provided by an operator. The cellular network is also referred to as a mobile network and may include a core network and an access network. A plurality of core network devices are deployed in the core network. The main functions of the core network devices include providing a connection to a terminal, management of the terminal, bearing services and serving as a bearer network to provide an interface to an external network. In the 5G NR system, the core network may include devices such as an Access and Mobility Management Function (AMF) entity, a User Plane Function (UPF) entity and a Session Management Function (SMF) entity. A plurality of access network devices (such as base stations) are deployed in the access network. The access network device is configured to provide a wireless communication function for the terminal. The cellular network may be a 2G network, a 3G network, a 4G network, a 5G network, a follow-up evolved cellular network or a combination thereof.

In the embodiment, the Wi-Fi component 310 is configured to acquire beacon frames from WLAN APs operating on n random access available frequency bands. A random access available frequency band is a frequency band, in the unlicensed frequency band, available for the terminal to initiate the random access, and n is a positive integer.

The cellular component 320 is configured to select a first random access available frequency band from the n random access available frequency bands based on channel indication information in respective beacon frames. Channel indication information in a beacon frame sent by a WLAN AP operating on an i-th random access available frequency band indicates a channel congestion level of the i-th random access available frequency band, and i is a positive integer less than or equal to n.

The cellular component 320 is further configured to initiate the random access in the first random access available frequency band.

According to the technical solution provided in the embodiment of the disclosure, for the random access in the unlicensed frequency band, the terminal acquires beacon frames from WLAN APs operating on a plurality of random access available frequency bands, and selects, based on channel indication information in respective beacon frames, a random access available frequency band from the plurality of random access available frequency bands for initiating the random access. The fact that the WLAN AP also operates on the unlicensed frequency band is fully considered, and the channel congestion levels of the random access available frequency bands are acquired by using the WLAN APs. Moreover, an appropriate random access available frequency band is selected for initiating the random access based on the channel congestion levels. Therefore, the success rate of the random access initiated by the terminal may be improved.

In addition, when there is a direct communication link between the Wi-Fi component 310 and the cellular component 320, the Wi-Fi component 310 may directly send the beacon frames to the cellular component 320 through the communication link. Then, the cellular component 320 determines the first random access available frequency band based on the channel indication information in respective beacon frames, and the cellular component 320 initiates the random access in the first random access available frequency band.

In a possible implementation, the cellular component 320 may be further configured to determine channel congestion levels of the n random access available frequency bands based on the channel indication information in the respective beacon frames, and select a random access available frequency band with a lowest channel congestion level from the n random access available frequency bands as the first random access available frequency band.

In a possible implementation, the cellular component 320 may be further configured to: in response to the terminal failing to initiate the random access in the first random access available frequency band, select a second random access available frequency band from the n random access available frequency bands based on the channel indication information in the respective beacon frames. The second random access available frequency band is different from the first random access available frequency band.

The cellular component 320 may be further configured to initiate the random access in the second random access available frequency band.

In a possible implementation, the channel indication information may include at least one of a BSS load element or a BSS average access delay element.

Figure 4:
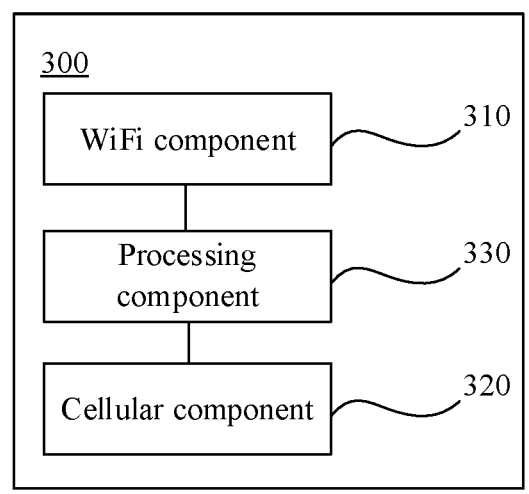
FIG. 4 is a block diagram illustrating a device for random access in an unlicensed frequency band according to another exemplary embodiment.

FIG. 4 is a block diagram illustrating a device for random access in an unlicensed frequency band according to another exemplary embodiment. The device is capable of implementing the operations in the above method examples, and the operations may be implemented by hardware or software executed by the hardware. The device may be the terminal described above, and may also be provided in the terminal. The device 300 may include a Wi-Fi component 310, a cellular component 320 and a processing component 330.

Specific descriptions about the Wi-Fi component 310 and the cellular component 320 may refer to the above embodiment of FIG. 3, and will not be elaborated in the embodiment.

The processing component 330 is a component configured to control various operations (such as detection, transmission and reception) of the terminal. For example, the processing component 330 may be a processor or controller in the terminal.

The Wi-Fi component 310 is configured to acquire beacon frames from WLAN APs operating on n random access available frequency bands. A random access available frequency band is a frequency band, in the unlicensed frequency band, available for the terminal to initiate the random access, and n is a positive integer.

The processing component 330 is configured to select a first random access available frequency band from the n random access available frequency bands based on channel indication information in respective beacon frames. Channel indication information in a beacon frame sent by a WLAN AP operating on an i-th random access available frequency band indicates a channel congestion level of the i-th random access available frequency band, and i is a positive integer less than or equal to n.

The cellular component 320 is configured to initiate the random access in the first random access available frequency band.

According to the technical solution provided in the embodiments of the disclosure, for the random access in the unlicensed frequency band, the terminal acquires beacon frames from WLAN APs operating on a plurality of random access available frequency bands, and selects, based on channel indication information in respective beacon frames, a random access available frequency band from the plurality of random access available frequency bands for initiating the random access. The fact that the WLAN AP also operates on the unlicensed frequency band is fully considered, and the channel congestion levels of the random access available frequency bands are acquired by using the WLAN APs. Moreover, an appropriate random access available frequency band is selected for initiating the random access based on the channel congestion levels. Therefore, the success rate of the random access initiated by the terminal may be improved.

In addition, when there is no direct communication link between the Wi-Fi component 310 and the cellular component 320, the Wi-Fi component 310 may send the beacon frames to the processing component 330. Then, the processing component 330 determines the first random access available frequency band and informs the first random access available frequency band to the cellular component 320, to enable the cellular component 320 to initiate the random access in the first random access available frequency band.

In a possible implementation, the processing component 330 may be further configured to determine channel congestion levels of the n random access available frequency bands based on the channel indication information in the respective beacon frames, and select a random access available frequency band with a lowest channel congestion level from the n random access available frequency bands as the first random access available frequency band.

In a possible implementation, the processing component 330 is further configured to: in response to the terminal failing to initiate the random access in the first random access available frequency band, select a second random access available frequency band from the n random access available frequency bands based on the channel indication information in the respective beacon frames. The second random access available frequency band is different from the first random access available frequency band.

The cellular component 320 is further configured to initiate the random access in the second random access available frequency band.

In a possible implementation, the channel indication information may include at least one of a BSS load element or a BSS average access delay element.

It is noted that in the devices provided in the above-mentioned embodiments with respect to FIG. 3 and FIG. 4, the "component" may also be referred to as a functional module, and the function of the "component" may be realized by hardware or software executed by the hardware. In addition, an implementation of the complete function of the technical solution of the present disclosure is only exemplarily described with reference to the above division of the components (or functional modules). In practical applications, the above-mentioned functions may be completed by different components (or functional modules) according to the actual needs. In other words, the internal structure of the device may be divided into different components (or functional modules) to complete all or part of the functions described above.

The specific implementation of operations performed by each component in the device in the foregoing embodiment has been described in detail in the embodiment of the related method, and detailed description will not be elaborated herein.

In an exemplary embodiment of the present disclosure, there is provided a device for random access in an unlicensed frequency band, to implement the method for the random access in the unlicensed frequency band at the terminal side provided in the disclosure. The device may be the terminal described above, and may also be provided in the terminal. The device includes a processor and a memory for storing instructions executable by the processor. The processor is configured to perform the following operations.

Beacon frames are acquired from WLAN APs operating on n random access available frequency bands. A random access available frequency band is a frequency band, in the unlicensed frequency band, available for the terminal to initiate the random access, and n is a positive integer.

A first random access available frequency band is selected from the n random access available frequency bands based on channel indication information in respective beacon frames. Channel indication information in a beacon frame sent by a WLAN AP operating on an i-th random access available frequency band indicates a channel congestion level of the i-th random access available frequency band, and i is a positive integer less than or equal to n.

The random access is initiated in the first random access available frequency band.

In a possible implementation, the processor may be configured to perform the following actions.

Channel congestion levels of the n random access available frequency bands are determined based on the channel indication information in the respective beacon frames.

A random access available frequency band with a lowest channel congestion level is selected from the n random access available frequency bands as the first random access available frequency band.

In a possible implementation, the processor may be further configured to perform the following actions.

In response to the terminal failing to initiate the random access in the first random access available frequency band, a second random access available frequency band is selected from the n random access available frequency bands based on the channel indication information in the respective beacon frames. The second random access available frequency band is different from the first random access available frequency band.

The random access is initiated in the second random access available frequency band.

In a possible implementation, the channel indication information includes at least one of a BSS load element or a BSS average access delay element.

Figure 5:
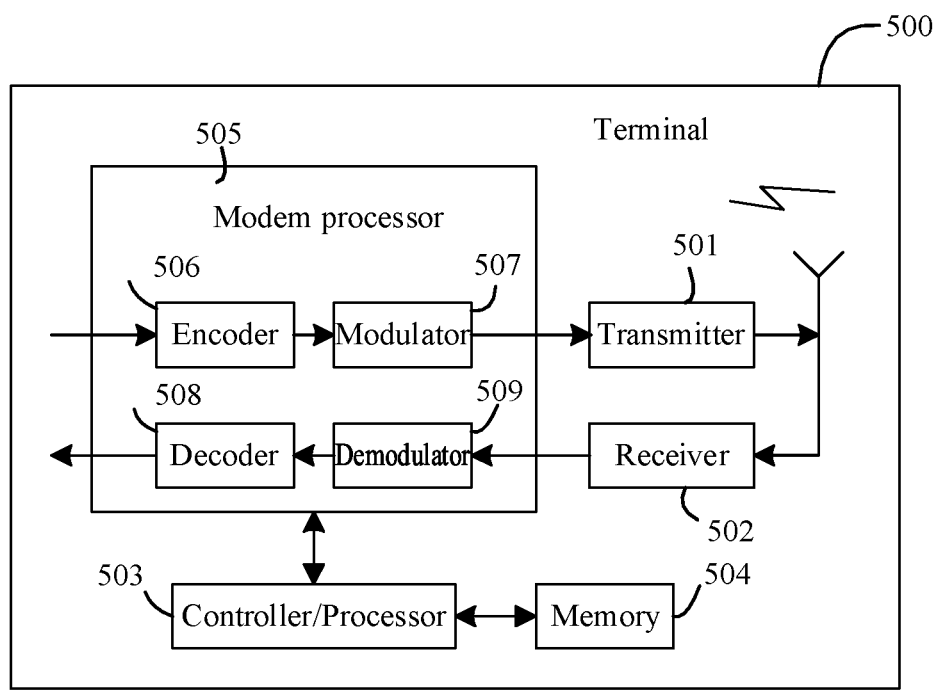
FIG. 5 is a structure diagram illustrating a terminal according to an exemplary embodiment.

FIG. 5 is a structure diagram illustrating a terminal according to an exemplary embodiment.

The terminal 500 includes a transmitter 501, a receiver 502 and a processor 503. The processor 503 may also be a controller, which is denoted as "controller/processor 503" in FIG. 5. In a possible implementation, the terminal 500 may further include a modem processor 505, and the modem processor 505 may include an encoder 506, a modulator 507, a decoder 508 and a demodulator 509.

In an example, the transmitter 501 adjusts (for example, performs analog conversion, filtering, amplification and up-conversion) output samples and generates an uplink signal, and the uplink signal is transmitted to the base station in the above embodiments via an antenna. The antenna receives a downlink signal transmitted by the base station in the above embodiments through a downlink. The receiver 502 adjusts (for example, performs filtering, amplification, down-conversion and digitalization) the signal received from the antenna and provides input samples. In the modem processor 505, the encoder 506 receives service data and signaling messages to be transmitted on the uplink, and processes the service data and signaling messages (for example, formatting, encoding, and interleaving). Further, the modulator 507 processes (for example, symbol mapping and modulation) the encoded service data and signaling messages and provides output samples. The demodulator 509 processes (for example, demodulation) the input samples and provides symbol estimation. The decoder 508 processes (for example, deinterleaving and decoding) the symbol estimation and provides the decoded data and signaling messages to be sent to the terminal 500. The encoder 506, the modulator 507, the demodulator 509 and the decoder 508 may be implemented as a synthesized modem processor 505. These units perform processing according to radio access technologies adopted by the radio access network (for example, the access technologies of LTE and other evolved systems). It is noted that when the terminal 500 does not include the modem processor 505, the foregoing functions of the modem processor 505 may also be performed by the processor 503.

The processor 503 controls and manages the operations of the terminal 500, to execute the processes performed by the terminal 500 in the foregoing embodiments of the present disclosure. For example, the processor 503 is further configured to execute operations at the terminal side in the foregoing method embodiment, and/or other operations of the technical solution described in the embodiment of the present disclosure.

Further, the terminal 500 may further include a memory 504, and the memory 504 is configured to store program codes and data for the terminal 500.

It should be understood that FIG. 5 only illustrates a simplified design of the terminal 500. In practical applications, the terminal 500 may include any number of transmitters, receivers, processors, modem processors, memories, etc. All the terminals capable of implementing the embodiments of the present disclosure fall within the scope of protection of the embodiments of the present disclosure.

An embodiment of the disclosure also provides a non-transitory computer-readable storage medium having stored thereon a computer program which, when being executed by the processor of the terminal, causes the processor to implement the method for the random access in the unlicensed frequency band at the terminal side described above.

In should be understood that the term "a plurality of" mentioned herein refers to two or more. The term "and/or" refers to an association relationship for describing the associated objects, and represents that three relationships may exist. For example, A and/or B may represent the following three cases: A exists separately, both A and B exist, and B exists separately. In addition, the character "/" generally refers to an "or" relationship between the associated objects.

Other embodiments of the disclosure will readily occur to those skilled in the art upon consideration of the specification and practice of the disclosure herein. This application is intended to cover any variations, uses or adaptations of the present disclosure that follow the general principles of the disclosure and include common general knowledge or customary technical means in the art that are not disclosed herein. The specification and examples are to be regarded as exemplary only, and the true scope and spirit of the disclosure are pointed out by the following claims.

It is to be understood that the disclosure is not limited to the precise construction already described above and illustrated in the accompanying drawings, and that various modifications and changes may be made without departing from the scope thereof. The scope of the disclosure is limited only by the appended claims.

What is claimed is:

1. A method for random access in an unlicensed frequency band, comprising:
   acquiring, by a terminal, beacon frames from Wireless Local Area Network Access Points (WLAN APs) operating on n random access available frequency bands, wherein a random access available frequency band is a frequency band, in the unlicensed frequency band, available for the terminal to initiate the random access, and n is a positive integer;
   selecting, by the terminal, a first random access available frequency band from the n random access available frequency bands based on channel indication information in respective beacon frames, wherein channel indication information in a beacon frame sent by a WLAN AP operating on an i-th random access available frequency band indicates a channel congestion level of the i-th random access available frequency band, and i is a positive integer less than or equal to n;

initiating, by the terminal, the random access in the first random access available frequency band;

in response to the terminal failing to initiate the random access in the first random access available frequency band, selecting, by the terminal, a second random access available frequency band from the n random access available frequency bands based on the channel indication information in the respective beacon frames, wherein the second random access available frequency band is different from the first random access available frequency band; and initiating, by the terminal, the random access in the second random access available frequency band.

2. The method of claim 1, wherein selecting, by the terminal, the first random access available frequency band from the n random access available frequency bands based on the channel indication information in the respective beacon frames comprises:

determining, by the terminal, channel congestion levels of the n random access available frequency bands based on the channel indication information in the respective beacon frames; and selecting, by the terminal, a random access available frequency band with a lowest channel congestion level from the n random access available frequency bands as the first random access available frequency band.

3. The method of claim 1, wherein the channel indication information comprises at least one of a Basic Service Set (BSS) load element or a BSS average access delay element.

4. A device for random access in an unlicensed frequency band, applied to a terminal, the device comprising:
a receiver;
a processor; and
a memory for storing instructions executable by the processor,
wherein the processor is configured to execute the instructions to:
control the receiver to acquire beacon frames from Wireless Local Area Network Access Points (WLAN APs) operating on n random access available frequency bands, wherein a random access available frequency band is a frequency band, in the unlicensed frequency band, available for the terminal to initiate the random access, and n is a positive integer;
select a first random access available frequency band from the n random access available frequency bands based on channel indication information in respective beacon frames, wherein channel indication information in a beacon frame sent by a WLAN AP operating on an i-th random access available frequency band indicates a channel congestion level of the i-th random access available frequency band, and i is a positive integer less than or equal to n;
initiate the random access in the first random access available frequency band;
in response to the terminal failing to initiate the random access in the first random access available frequency band, select a second random access available frequency band from the n random access available frequency bands based on the channel indication information in the respective beacon frames, wherein the second random access available frequency band is different from the first random access available frequency band; and
initiate the random access in the second random access available frequency band.

5. The device of claim 4, wherein the processor is further configured to:
determine channel congestion levels of the n random access available frequency bands based on the channel indication information in the respective beacon frames; and
select a random access available frequency band with a lowest channel congestion level from the n random access available frequency bands as the first random access available frequency band.

6. A non-transitory computer-readable storage medium having stored thereon a computer program which, when being executed by a processor, causes the processor to implement a method for random access in an unlicensed frequency band, the method comprising:
acquiring beacon frames from Wireless Local Area Network Access Points (WLAN APs) operating on n random access available frequency bands, wherein a random access available frequency band is a frequency band, in the unlicensed frequency band, available for a terminal to initiate the random access, and n is a positive integer;
selecting a first random access available frequency band from the n random access available frequency bands based on channel indication information in respective beacon frames, wherein channel indication information in a beacon frame sent by a WLAN AP operating on an i-th random access available frequency band indicates a channel congestion level of the i-th random access available frequency band, and i is a positive integer less than or equal to n;
initiating the random access in the first random access available frequency band;
in response to the terminal failing to initiate the random access in the first random access available frequency band, selecting a second random access available frequency band from the n random access available frequency bands based on the channel indication information in the respective beacon frames, wherein the second random access available frequency band is different from the first random access available frequency band; and
initiating the random access in the second random access available frequency band.

7. The non-transitory computer-readable storage medium of claim 6, wherein selecting the first random access available frequency band from the n random access available frequency bands based on the channel indication information in the respective beacon frames comprises:
determining channel congestion levels of the n random access available frequency bands based on the channel indication information in the respective beacon frames; and
selecting a random access available frequency band with a lowest channel congestion level from the n random access available frequency bands as the first random access available frequency band.

8. The non-transitory computer-readable storage medium of claim 6, wherein the channel indication information comprises at least one of a Basic Service Set (BSS) load element or a BSS average access delay element.

9. The device of claim 4, wherein the channel indication information comprises at least one of a Basic Service Set (BSS) load element or a BSS average access delay element.

\* \* \* \* \*